United States Patent

Seats et al.

[11] Patent Number: 5,853,645
[45] Date of Patent: Dec. 29, 1998

[54] LOW PRESSURE MOLDING COMPOSITIONS

[75] Inventors: Robert Lawrence Seats, Winfield; Kenneth Earl Atkins, South Charleston; Carroll Glenn Reid, Charleston, all of W. Va.

[73] Assignee: Union Carbide Chemicals & Plastics Technology Corporation, Danbury, Conn.

[21] Appl. No.: 596,722

[22] Filed: Feb. 5, 1996

[51] Int. Cl.⁶ ........................................... C08J 5/00
[52] U.S. Cl. ................. 264/331.15; 264/331.17; 264/328.17; 264/328.18; 523/523; 524/430; 524/433; 524/436
[58] Field of Search ............................. 523/523; 524/430, 524/433, 436, 599, 602, 417, 145; 264/331.15, 331.17, 328.17, 328.18

[56] References Cited

U.S. PATENT DOCUMENTS

| | | | |
|---|---|---|---|
| 3,992,479 | 11/1976 | Roberts | 260/862 |
| 4,026,965 | 5/1977 | Roberts | 260/862 |
| 4,128,601 | 12/1978 | McCluskey | 260/862 |
| 4,172,059 | 10/1979 | Atkins et al. | 260/22 CB |
| 4,777,195 | 10/1988 | Hesse et al. | 523/461 |

*Primary Examiner*—James J. Seidleck
*Assistant Examiner*—U. K. Rajguru
*Attorney, Agent, or Firm*—W. K. Volles

[57] ABSTRACT

Improved low pressure molding compositions are disclosed which comprise an unsaturated thermosetting resin, an olefinically unsaturated monomer copolymerizable with the thermosetting resin, a viscosity reducing additive, a thermoplastic additive and a thickener comprising one or more alkaline earth metal oxides or hydroxides which can provide the molding compositions with viscosities of less than 25 MMcps after aging.

9 Claims, No Drawings

LOW PRESSURE MOLDING COMPOSITIONS

FIELD OF THE INVENTION

The present invention relates to molding compositions, processes for molding articles under low pressure using such compositions and articles molded therefrom.

BACKGROUND OF THE INVENTION

Molding compositions suitable for use in low pressure molding processes, i.e., about 30 to 400 psig, are desirable for use in manufacturing a variety of molded articles, such as, for example, automotive body panels, truck cab components, bathtubs, doors, etc. Such molding compositions typically contain an unsaturated thermosetting resin, an olefinically unsaturated monomer which is copolymerizable with thermosetting resin, a thermoplastic additive, fibrous materials and various other ingredients, including for example, fillers, mold release agents, and the like.

In order for such molding compositions to be effective in low pressure molding processes, the viscosities of the molding compositions must be low enough to adequately wet the fibrous materials in the compositions and also permit the molding composition to flow through the mold under the desired molding pressure. Accordingly, it is not uncommon for such molding compositions to include viscosity reducing additives, such as, for example, aliphatic monocarboxylic acids, amino acids, amido acids, phosphate esters, polyalkylene oxides, etc.

However, while typical low pressure molding compositions often have acceptable viscosities shortly after formulation, the viscosities of the molding compositions often rise to levels which render the molding compositions unproccesable at the low molding pressures after aging, e.g., 1–4 days. Accordingly, improved molding compositions are desired for use in low pressure molding processes which have viscosities effective to permit the molding compositions to be molded using low pressure molding process even after aging for periods of at least 1 to 4 days.

SUMMARY OF THE INVENTION

By the present invention, improved molding compositions are provided which are suitable for use in low pressure molding processes. The molding compositions of the present invention comprise an unsaturated thermosetting resin, an olefinically unsaturated monomer which is copolymerizable with the thermosetting resin, a thermoplastic additive and a thickener. The improvement is directed to the incorporation into the molding composition of thickeners comprising one or more alkaline earth metal oxides or hydroxides, e.g., magnesium hydroxide and calcium hydroxide, in amounts effective to provide the molding compositions with a viscosity of less than about 25 million centipoise ("MMcps") after aging for at least one, preferably four days. When the thermoplastic additives have an acid number of 3 or greater, improved flexibility in the selection of the alkaline earth metal oxides and hydroxides is provided. Even when the thermoplastic additives have an acid number of less than 3, suitable molding compositions can be prepared using thickeners comprising magnesium and calcium oxides or hydroxides. The present invention also provides processes for molding articles using the improved molding compositions of the present invention and articles molded therefrom.

In accordance with the present invention it is now possible to provide molding compositions having stabilized viscosities which have excellent handling properties particularly as sheet molding compounds ("SMC"). As a result, it is no longer necessary for molders to rush their molding operations because of molding compositions that undergo a rapid increase in viscosity during aging.

DETAILED DESCRIPTION OF THE INVENTION

The unsaturated thermosetting resins suitable for use in accordance with the present invention include those unsaturated polymeric materials which can be crosslinked to form thermoset articles. Typically, the unsaturated thermosetting resins have an average molecular weight of at least 500, preferably from about 500 to 10,000 grams per gram mole ("g/gmole"). As used herein the term average molecular weight means weight average molecular weight. Methods for determining weight average molecular weight are known to those skilled in the art. One preferred method for determining weight average molecular weight is gel permeation chromatography.

Typical unsaturated thermosetting resins include, for example, epoxy diacrylates, polyester diacrylates, polyurethane diacrylates, acrylate capped polyurethane polyacrylates, acrylated polyacrylates, acrylated polyethers and the like. Especially preferred thermosetting resins include polyesters and vinyl esters. As used herein, the term "polyesters" includes vinyl esters. Such unsaturated thermosetting resins are commercially available or alternatively can be readily prepared by those skilled in the art. Examples of suitable unsaturated thermosetting resins for use in accordance with the present invention are described for example in U.S. Pat. Nos. 4,172,059 and 4,942,001.

One or more unsaturated thermosetting resins may be employed in the molding compositions of the present invention. The total amount of unsaturated thermosetting resins in the molding compositions of the present invention is typically from about 15 to 80 parts by weight, preferably from about 20 to 60 parts by weight, and more preferably from about 25 to 50 parts by weight based on the weight of the unsaturated thermosetting resin, thermoplastic additive, and crosslinking monomer. Further details concerning the selection and amounts of unsaturated thermosetting resins are known to those skilled in the art.

The olefinically unsaturated monomers (also referred to herein as "crosslinking monomers") suitable for use in accordance with the present invention include materials which are copolymerizable with the unsaturated thermosetting resins. The monomer also serves the function of dissolving the thermosetting resin thereby by facilitating its interaction with the other components of the molding composition. Preferably, the olefinic unsaturation is due to ethylenic unsaturation. Typical olefinically unsaturated monomers include, for example, styrene, vinyl toluene isomers, methyl methacrylate, acryl nitrile and substituted styrene such as, for example, chlorostyrene and alphamethylstyrene. Multifunctional monomers, such as, for example, divinylbenzene or multifunctional acrylates or methacrylates may also be employed. Styrene is a preferred monomer for use in the compositions of the present invention.

One or more olefinically unsaturated monomers may be used in the molding compositions of the present invention. Typically, the total amount of the olefinically unsaturated monomers is from about 20 to 80 parts by weight, preferably from about 30 to 65 parts by weight, and more preferably from about 40 to 55 parts by weight based on the weight of the unsaturated thermosetting resin, thermoplastic additive, and crosslinking monomer. Such monomers are readily commercially available. Further details concerning the selection and amounts of the olefinically unsaturated monomers are known to those skilled in the art.

The molding compositions of the present invention also preferably comprise a viscosity reducing additive. The viscosity reducing additives suitable for use in accordance with the present invention include those which promote the reduction in viscosity of the molding compositions of the present invention. Typical viscosity reducing additives include, for example, aliphatic monocarboxylic acids having at least 6 carbon atoms, e.g., saturated or unsaturated fatty acids from about 6 to 24 or more carbon atoms in the chain, amino acids, amido acids, phosphate esters, polyalkylene oxides and other materials known to those skilled in the art. Amino acids are preferred viscosity reducing additives for use in the compositions of the present invention. Particularly preferred amino acids have the general formula

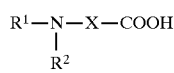

where $R^1$ is hydrogen or $C_1$–$C_4$-alkyl, $R^2$ is a long-chain aliphatic alkyl or acyl radical having about 6 to 30 carbon atoms which may be saturated or unsaturated, straight-chain or branched, and X is an alkylene having 1 to about 6 carbon atoms which may be straight-chain or branched. Such preferred viscosity reducing additives are described in U.S. Pat. No. 4,777,195.

One or more of the viscosity reducing additives may be employed in the compositions of the present invention. Typically, the amount of the viscosity reducing additive is from about 0.5 to 10 parts, preferably from about 1 to 7 parts, and more preferably from about 2 to 5 parts based on the weight of the unsaturated thermosetting resin, thermoplastic additive, and crosslinking monomer. Such viscosity reducing additives are commercially available or alternatively can be prepared by those skilled in the art. Further details concerning the selection and amounts of the viscosity reducing additives are known to those skilled in the art.

In one aspect of the present invention, the thermoplastic additives are those which have an Acid Number of greater than 3, preferably from about 4 to 8, more preferably from about 4 to 6. As used herein, the term "Acid Number" means the amount of carboxyl present in the thermoplastic additive expressed as milligrams of potassium hydroxide per gram of additive. Further details of measuring Acid Number are known to those skilled in the art. Quite surprisingly, in accordance with the present invention it has been found that the use of thermoplastic additives with an Acid Number greater than 3 can promote enhanced compatability between the components of the molding compositions of the present invention. Also, improved flexibility in the selection of the alkaline earth metal oxides and hydroxides which comprise the thickeners (described in further detail herein) can be obtained using thermoplastic additives with an Acid Number of greater than 3. Typical of such thermoplastic additives include for example, polyvinyl acetate homopolymers and copolymers, e.g., vinyl acetate copolymerized with acrylic acid, crotonic acid, vinyl chloride, polyurethanes, saturated straight-chain and cyclic polyesters, polyalkyl acrylates, or methacrylates and the like. Polyvinyl acetates are preferred thermoplastic additives for use in accordance with the present invention.

In another aspect of the present invention, the thermoplastic additive has an Acid Number of 3 or less. Such thermoplastic additives include polymers or copolymers or mixtures thereof which can be prepared employing a free-radical initiator and at least one ethylenically unsaturated monomer. Suitable monomers include alkyl methacrylates and alkyl acrylates in which the alkyl group contains up to about 18 carbon atoms, including alkyl groups chosen from methyl, ethyl, n-propyl, iso-propyl, n-butyl, isobutyl, 2-ethylhexyl, stearyl and the like, and mixtures thereof. Also suitable are cyclic methacrylates and acrylates wherein the cyclic group is chosen from cyclohexyl, benzyl, bicyclic groupos such as isobornyl, bornyl, fenchyl, isofenchyl, and the like. Particularly suitable are monovinyl aromatic compounds such as styrene, substituted styrenes such as α-methyl styrene, vinyl toluene, tert-butylstyrene, halogen substituted styrenes such as chlorostyrene, dichlorostyrene and the like, and mixtures thereof.

The average molecular weights of the thermoplastic additives of the present invention are from about 10,000 to 250,000, preferably from about 25,000 to 200,000 and more preferably from about 50,000 to 180,000 g/gmole. These thermoplastic additives can be used in conjuction with lower molecular weight materials which can enhance their shrinkage control ability such as epoxys, lower reactivity secondary monomers and others. Examples of such approaches are disclosed in U.S. Pat. Nos 4,525,498, 4,755,557, and 4,374, 215.

One or more thermoplastic additives may be employed in the compositions of the present invention. Typically, the total amount of the thermoplastic additives is from about 3 to 30 parts, preferably from about 5 to 25 parts, and more preferably from about 8 to 20 parts based on the weight of the unsaturated thermosetting resin, thermoplastic additive, and crosslinking monomer. Further details of the thermoplastic additives suitable for use in accordance with the present invention are described, for example, in U.S. Pat. No. 4,172,059. Such thermoplastic additives are commercially available or alternatively can be prepared by those skilled in the art. Further details concerning the selection and amounts of the thermoplastic additives are known to those skilled in the art.

The thickeners suitable for use in accordance with the present invention comprise one or more alkaline earth metal oxides or hydroxides. For example, such materials may be selected from the group consisting of magnesium oxide, magnesium hydroxide, calcium oxide, calcium hydroxide, zinc oxide, barium oxide and mixtures thereof. Preferably, the thickener comprises two or more alkaline earth metal oxides or hydroxides. In accordance with the present invention, the selection and amounts of the alkaline earth metal oxides or hydroxides are effective to provide a Molding Viscosity of less than about 25 MMcps, preferably from about 2 to 20 MMcps, and more preferably from about 4 to 15 MMcps. As used herein, the term "Molding Viscosity" means the viscosity of the molding composition measured at least 1 day, and preferably at least 4 days, after the molding composition is prepared. The Molding Viscosities referred to are made with reference to those determined using a Brookfield Viscometer, model HBT, with a Helipath stand and spindle T-F at 1 revolution per minute ("rpm") unless otherwise indicated. Further details concerning the measurement of the viscosity are known to those skilled in the art.

The total amount of thickener suitable for use in the molding compositions of the present invention is from about 0.5 to 10 parts, preferably from about 1 to 8 parts, and more preferably from about 2 to 6 parts based on the weight of the unsaturated polyester, thermoplastic additive, and crosslinking monomer. The materials which comprise the thickeners of the present invention are readily commercially available.

Quite surprisingly, it has been found that by the appropriate selection and amounts of alkaline earth metal oxides or hydroxides in combination with the thermoplastic additives can provide the molding compositions with the desired Molding Viscosity while still retaining suitable handling properties, e.g., low tackiness, especially in SMC compositions. Where the thermoplastic additive has an Acid Number of greater than 3, a variety of alkaline earth metal oxides and hydroxides can be employed as compared to when the Acid Number is less than 3. Even when the thermoplastic additive has an Acid Number of 3 or less, a thickener which comprises magnesium oxide or hydroxide and calcium oxide hydroxide can provide suitable Molding Viscosities and handling properties. In one preferred aspect of the present invention, the thickener comprises calcium hydroxide or calcium oxide and magnesium hydroxide or magnesium oxide in a magnesium to calcium weight ratio of from about 0:5 to 20:1, preferably less than 9:1, and more preferably from about 1:1 to 9:1. Another preferred thickener where the thermoplastic additive has an Acid Number of greater than 3 comprises calcium hydroxide or calcium oxide and zinc oxide in the ratios described above with zinc substituted for magnesium.

In addition, it has been found in accordance with the present invention that combinations of two, or more, alkaline earth metal oxides or hydroxides can stabilize the composition such that the wide ranging amount of thickener described above, e.g., 1 to 8 weight parts, to be introduced into the molding compositions. In contrast, when typical thickeners used in the art which comprise only one alkaline earth metal oxide, e.g., magnesium oxide or calcium oxide, only very small derivatives in concentration are tolerable, e.g., a change from 0.6 weight parts to 1.0 weight parts can cause excessive changes in Molding Viscosity.

The fiber reinforcements which are often employed in the molding compositions of the invention can be, for example, any of those known to the art for use in molding compositions. Examples of such materials are glass fibers or fabrics, carbon fibers and fabrics, asbestos fibers or fabrics, various organic fibers and fabrics such as those made of polypropylene, acrylonitrile/vinyl chloride copolymer, and others known to the art. These reinforcing materials are typically employed in the molding compositions at a level of from about 5 to 80 weight parts, based on the total weight of the composition and preferably 15 to 50 weight parts.

In addition to the above-described ingredients, the molding compositions of the present invention also frequently contain pigment. The amount of pigment may vary widely, depending on the particular molding composition and pigment used. It is typically employed in the range of about 0.5 to 15 weight parts based on the total weight of the composition.

The molding compositions of the invention may also contain one or more other conventional additives, which are employed for their known purposes in the amounts known to those skilled in the art. The following are illustrative of such additives:

1. Polymerization initiators such as t-butyl hydroperoxide, t-butyl perbenzoate, benzoyl peroxide, t-butyl peroctoate, cumene hydroperoxide, methyl ethyl ketone peroxide, peroxy ketals, and others known to the art, to catalyze the reaction between the olefinically unsaturated monomer and the thermosetting resin. The polymerization initiator is employed in a catalytically effective amount, such as from about 0.3 to about 3, based on the weight of the unsaturated thermosetting resin, thermoplastic additive, and crosslinking monomer.
2. Fillers such as clay, alumina trihydrate, silica, calcium carbonate, and others known to the art;
3. Mold release agents or lubricants, such as zinc stearate, calcium stearate, and others known to the art; and
4. Water.

One especially preferred molding composition in accordance with the present invention comprises:
(i) from about 20 to 60, preferably 27 to 35, weight parts based on the weight of the unsaturated thermosetting resin, thermoplastic additive, and crosslinking monomer of an unsaturated polyester;
(ii) from about 30 to 65, preferably 47 to 55, weight parts based on the weight of the unsaturated thermosetting resin, thermoplastic additive, and crosslinking monomer of an olefinically unsaturated monomer which is copolymerizable with the unsaturated polyester;
(iii) from about 1 to 6, preferably 2 to 4, weight parts based on the weight of the unsaturated thermosetting resin, thermoplastic additive, and crosslinking monomer of an amino acid having the formula

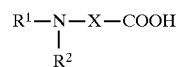

where $R^1$ is hydrogen or $C_1$–$C_4$-alkyl, $R^2$ is a long-chain aliphatic, alkyl or acyl radical having about 6 to 30 carbon atoms which may be saturated or unsaturated, straight-chain or branched, and X is an alkylene having from 1 to about 6 carbon atoms which may be straight-chain or branched;
(iv) from about 5 to 25, preferably 10 to 14, weight parts based on the weight of the unsaturated thermosetting resin, thermoplastic additive, and crosslinking monomer of a polyvinyl acetate homopolymer or copolymer having a weight average molecular weight of from about 70,000 to 120,000 grams per gram mole and an Acid Number of greater than 3; and
(v) from about 0.5 to 10, preferably 4 to 6, weight parts based on the weight of the unsaturated thermosetting resin, thermoplastic additive, and crosslinking monomer of one or more alkaline earth metal oxides or hydroxides selected from the group consisting of magnesium oxide, hydroxide, calcium oxide, calcium hydroxy and zinc oxide; said molding composition having a Molding Viscosity of less than 25 MMcps.

The molding compositions of the present invention can be prepared by methods known to those skilled in the art, such as for example, mixing the components in a suitable apparatus such as Hobart mixer at temperatures on the order of about 20° to 50° C. The components may be combined in any convenient order. Generally, it is preferable that the thermosetting resin and thermoplastic additive are added in liquid form by preparing a solution thereof in the monomer. All the liquid components are then typically mixed together before adding the fillers, thickening agents and optional ingredients.

Once formulated, the molding compositions can be molded into thermoset articles of the desired shape, e.g., automotive fenders, hoods, bathtubs, doors, and the like. The specific conditions used in the molding process depend on the composition being molded as well as upon the nature of the particular articles desired, the details of which are known to those skilled in the art. Typical molding pressures for use in accordance with the present invention are from about 30 to 500 psig, preferably from about 100 to 400 psig, and more preferably from about 150 to 300 psig. Suitable molding temperatures are from about 180° to 350° F., preferably from about 200° to 320° and more preferably from about 250° to 310° F. Typical molding time periods range from about 0.5 to about 5 minutes or longer.

The molding compositions are suitable for use, for example, as sheet molding compounds and bulk molding compounds, with sheet molding compounds being more typical. For example, sheet molding compound can be produced by laying down a first layer of the molding composition, i.e., paste, on a first layer of polyethylene film or the equivalent thereof, laying on this first layer of the paste filler reinforcements such as chopped glass fibers, and laying thereover a second layer of the paste. The two layers of the paste with the filler reinforcements sandwiched therebetween are then topped with a second sheet of polyethylene film and the resulting composite (sheet molding compound) is stored. Further details concerning the manufacture, handling and use of sheet molding compounds and bulk molding compounds are known to those skilled in the art.

Often, the molding compositions of the present invention will be allowed to age for from 1 to about 4 days or more, e.g. 7 days.

The following examples are provided for illustrative purposes and are not intended to limit the scope of the claims which follow.

The following materials were used in the examples set forth below:

DEFINITIONS

Component A—a highly reactive unsaturated polyester resin sold by Ashland Chemical Company under the product name MR-13006 for automotive body and panel molding applications.

Component B—A blend of a copolymer of acrylic acid with vinyl acetate, said copolymer having an acid number of 6, an epoxidized octyl tallate, a vinyl ester monomer, and styrene monomer sold by Union Carbide Corporation under the product name Neulon®-T Plus as a shrinkage control additive.

Component C—A viscosity reducer sold by Byk chemie under the designation Byk W-995.

Component D—A five percent solution of parabenzoquinone in diallylphthalate.

Component E—An amino acid viscosity reducer, oleyl sacrosine supplied by Hampshire Chemical (New Hampshire, USA) as Hamposyl O.

Component F—A calcium carbonate filler supplied by Georgia Marble and sold under the designation CalWhite II™.

Component G—A blend of magnesium hydroxide and calcium hydroxide at a 3.75/1.0 ratio at 28% dispersed in a styrene/polystyrene carrier resin solution.

Component H—A 38% dispersion magnesium oxide in a low molecular weight polyester sold by Plasticolors, Inc. as PG-9033.

Component I—A technical grade magnesium hydroxide supplied by Barcroft, Inc. as Magnesium Hydroxide, Tech Grade.

Component J—A thickener dispersion comprised of 36% of a 33 weight percent solids solution of a poly(vinyl acetate) homopolymer sold by Union Carbide Corporation as LP-85 dissolved in styrene monomer; 8% of a technical grade calcium oxide sold by Aldrich Chemical Co.; 1.4% of a black pigment dispersion; and 54.6% of Component F.

Component K—A technical grade calcium hydroxide sold by Fisher Scientific Co.

Component L—A technical grade zinc oxide sold by Fisher Scientific Co.

Component M—A blend of copolymer of acrylic acid with vinyl acetate, said copolymer having an acid number of 3, an epoxidized octyl tallate , a vinyl ester monomer, and styrene monomer.

Component N—A non carboxylate polystyrene at 34% solids in styrene monomer sold by AShland Chemical Company under the product name MR-63004.

Procedure for Determining the Acid Number of the Thermoplastic Additive

Add 5 to 6 drops of 0.5 percent bromothymol blue indicator in methanol to a flask containing approximately 60 milliliters ("ml") of acetone and neutralize with 0.1N alcoholic potassium hydroxide to a blue endpoint. While stirring with a magnetic stirring bar introduce 13 to 15 g of sample resin weighed to the nearest 0.1 g into the flask. Cap lightly and stir until all resin is disolved. Titrate the solution with 0.1N alcoholic potassium hydroxide to the same blue endpoint as above. The acid number is then calculated by:

Acid Number=ml KOH×N×56.1/resin weight and is expressed as milligrams ("mg") of KOH per gram of resin.

Procedure for Preparation of Molding Compositions for Determination of Thickening Response All of the liquid components were weighed individually into metal pint cans placed on a Mettler balance. The contents of the containers were mixed with a high speed Cowles type dissolver. The agitator was started a slow speed, then increased to a medium speed to completely mix the liquids. A solid mold release agent was next added to the liquids and mixed until completely dispersed. The solid filler (Component F) was next added gradually until a consistent paste was obtained and then further mixed to a minimum temperature of 90° F. The thickener was next mixed into the paste until completely dissolved. A stopwatch was then started and the viscosity was determined at three and fifteen minute intervals using a Brookfield RVT viscometer ("processing viscosity"). This viscosity indicates the ability of the paste to wet the fiberglass during the compounding operation. The processing viscosity is reported in thousand centipoise ("Mcps"). Molding Viscosity was also determined and after one day using a Brookfield HBT Synchro-Lectric Viscometer on a Helipath Stand. The above described procedure was used to prepare the molding compositions used in the examples (also referred to as "formulations").

Procedure for Preparation of Sheet Molding Compound (SMC) Formulations

All the liquid components were weighed individually into a five gallon open top container placed on a Mettler balance. The contents of the container were then mixed with a high speed Cowles type dissolver. The agitator was started a slow speed, then increased to medium speed to completely mix the liquids over a period of 2–3 minutes. The mold release agent was next added to the liquids from an ice cream carton and mixed until completely dispersed. The filler was next added gradually from a tarred container until a consistent paste was obtained and the contents were then further mixed to a minimum temperature of 90° F. The thickener was next mixed into the paste over a period of 2–3 minutes. The paste was next added to doctor boxes on a sheet molding compound (SMC) machine where the paste is metered into a film on the carrier sheet where it is further combined with fiber glass (1 inch fibers). The sheet molding compound was then allowed to mature to molding viscosity and then evaluated for fiberglass wet-out, sheet dryness, and carrier film peelability.

Fiberglass wet-out was determined by cutting a strip of the SMC and visually evaluating for dry glass fibers. Good wet-out indicates that very little or no dry glass fibers were detected. Poor wet-out indicates that a significant amount of glass fibers was detected. Carrier film peelability was determined as the ability to remove the top and bottom film without leaving adhered to the film any of the molding compound. Sheet dryness was then determined by placing a hand on the peeled sheet and evaluating the amount of molding compound adhered to the hand. Good dryness indicates little or no adherence to the hand while poor indicates a significant amount of compound adhering to the hand.

EXAMPLE I

This example shows formulations containing a thickener and no viscosity reducer. The components of the formulations are shown in Table 1 with all components being expressed in parts by weight. The level of Component G was varied from 10 parts by weight to 16 parts by weight. Over this range the four day viscosity increased by approximately 28% and all four day viscosity values are too high for low pressure molding.

TABLE 1

|  | I | II | III | IV |
| --- | --- | --- | --- | --- |
| Component A | 51.8 | 51.8 | 51.8 | 51.8 |
| Component B | 33 | 33 | 33 | 33 |
| Styrene | 5 | 5 | 5 | 5 |
| Divinylbenzene | 3.9 | 3.9 | 3.9 | 3.9 |
| Component C | 3.3 | 3.3 | 3.3 | 3.3 |
| Component D | 0.7 | 0.7 | 0.7 | 0.7 |
| t-butyl perbenzoate | 1.8 | 1.8 | 1.8 | 1.8 |
| Zinc Stearate | 4 | 4 | 4 | 4 |
| Component F | 210 | 210 | 210 | 210 |
| Component G | 10 | 12 | 14 | 16 |
| Viscosity (Mcps) |  |  |  |  |
| After 3 min. | 48 | 56 | 57.6 | 56 |
| After 15 min. | 169.6 | 246.4 | 292.8 | 304 |
| Viscosity (MMcps) |  |  |  |  |
| After 1 day | 18.6 | 26.9 | 29.2 | 30.8 |
| After 2 days | 27 | 24.8 | 29.2 | 30.8 |
| After 4 days | 28.3 | 32.8 | 33.5 | 35.7 |

EXAMPLE II

This example illustrates the incorporation of a viscosity reducer into the formulation. The formulations were thickened with the same agent used in Example I and are shown in Table 2. Over this range of thickening agent the five day viscosity decreased approximately 11%. At all thickening agent levels, the five day viscosity was very good for low pressure molding.

TABLE 2

|  | I | II | III | IV |
| --- | --- | --- | --- | --- |
| Component A | 51.8 | 51.8 | 51.8 | 51.8 |
| Component B | 33 | 33 | 33 | 33 |
| Styrene | 5 | 5 | 5 | 5 |
| Divinylbenzene | 3.9 | 3.9 | 3.9 | 3.9 |
| Component C | 3.3 | 3.3 | 3.3 | 3.3 |

TABLE 2-continued

|  | I | II | III | IV |
| --- | --- | --- | --- | --- |
| Component D | 0.7 | 0.7 | 0.7 | 0.7 |
| t-butyl perbenzoate | 1.8 | 1.8 | 1.8 | 1.8 |
| Component E | 3 | 3 | 3 | 3 |
| Zinc Stearate | 1 | 1 | 1 | 1 |
| Component F | 210 | 210 | 210 | 210 |
| Component G | 14 | 16 | 18 | 20 |
| Viscosity (Mcps) |  |  |  |  |
| After 3 min. | 32 | 40 | 36.8 | 40 |
| After 15 min. | 105.6 | 160 | 150.4 | 188.8 |
| Viscosity (MMcps) |  |  |  |  |
| After 1 day | 6.4 | 7.6 | 7.6 | 6 |
| After 2 days | 7.6 | 7.4 | 7.4 | 5.8 |
| After 4 days | 9.4 | 9.2 | 10.2 | 7.7 |
| After 5 days | 8.9 | 8.8 | 9.6 | 7.8 |

EXAMPLE III

Component G is comprised of a blend of Component I and Component K at a 3.75 to 1 ratio at 28% in a carrier resin solution. Table 3 shows the effect of different ratios of Component I and K. Run II illustrates a blend equal to Component G. Run I gives molding viscosity higher than that preferred for low pressure molding. Runs II, III, IV, and V achieve good low pressure molding viscosity.

TABLE 3

|  | I | II | III | IV | V |
| --- | --- | --- | --- | --- | --- |
| Component A | 51.8 | 51.8 | 51.8 | 51.8 | 51.8 |
| Component B | 33 | 33 | 33 | 33 | 33 |
| Styrene | 5 | 5 | 5 | 5 | 5 |
| Divinylbenzene | 3.9 | 3.9 | 3.9 | 3.9 | 3.9 |
| Component C | 3.3 | 3.3 | 3.3 | 3.3 | 3.3 |
| Component D | 0.7 | 0.7 | 0.7 | 0.7 | 0.7 |
| t-butyl perbenzoate | 1.8 | 1.8 | 1.8 | 1.8 | 1.8 |
| Component E | 3 | 3 | 3 | 3 | 3 |
| Zinc Stearate | 1 | 1 | 1 | 1 | 1 |
| Component F | 210 | 210 | 210 | 210 | 210 |
| Component I | 4.03 | 3.54 | 3.14 | 2.69 | 2.24 |
| Component K | 0.45 | 0.94 | 1.34 | 1.79 | 2.24 |
| Viscosity (Mcps) |  |  |  |  |  |
| After 3 min. | 22.8 | 37.5 | 49.4 | 55.6 | 159.6 |
| After 15 min. | 78 | 207 | 572.8 | 649.6 | 732.8 |
| Viscosity (MMcps) |  |  |  |  |  |
| After 1 day | 12.5 | 6.6 | 6.3 | 6.9 | 6 |
| After 2 days | 17.8 | 8.3 | 7.1 | 9 | 7.6 |
| After 3 days | 27.7 | 13.3 | 9.5 | 9 | 10.1 |
| After 4 days | 29.2 | 16.6 | 11.4 | 10.2 | 10.8 |

EXAMPLE IV

This example illustrates the effect of magnesium oxide on the thickening response of the formulation in Example II. Table 4 shows that low pressure molding viscosity was obtained with low concentrations of Component H (Run I). The molding viscosity was very sensitive to the concentration of Component H.

TABLE 4

|  | I | II | III | IV |
| --- | --- | --- | --- | --- |
| Component A | 51.8 | 51.8 | 51.8 | 51.8 |
| Component B | 33 | 33 | 33 | 33 |

TABLE 4-continued

|  | I | II | III | IV |
|---|---|---|---|---|
| Styrene | 5 | 5 | 5 | 5 |
| Divinylbenzene | 3.9 | 3.9 | 3.9 | 3.9 |
| Component C | 3.3 | 3.3 | 3.3 | 3.3 |
| Component D | 0.7 | 0.7 | 0.7 | 0.7 |
| t-butyl perbenzoate | 1.8 | 1.8 | 1.8 | 1.8 |
| Component E | 3 | 3 | 3 | 3 |
| Zinc Stearate | 1 | 1 | 1 | 1 |
| Component F | 210 | 210 | 210 | 210 |
| Component H | 1.8 | 2.1 | 2.4 | 2.7 |
| Viscosity (Mcps) |  |  |  |  |
| After 3 min. | 7.5 | 7.6 | 8.8 | 9 |
| After 15 min. | 14.9 | 19.8 | 23.7 | 27.3 |
| Viscosity (MMcps) |  |  |  |  |
| After 1 day | 11.3 | 28.2 | 46.6 | 71.8 |
| After 2 days | 13 | 39.3 | >80 | >80 |
| After 3 days | 12.6 | 37.4 | >80 | >80 |
| After 4 days | 13.1 | 47 | >80 | >80 |

EXAMPLE 5

Table 5 shows the effect of magnesium hydroxide on the thickening response of the formulation in Example II. Over the range of amounts of thickening agent tested, the desired low pressure Molding Viscosity of less than 25 MMcps was not obtained. Compared to Component G, the molding viscosity is very sensitive to the concentration of Component I.

TABLE 5

|  | I | II | III | IV |
|---|---|---|---|---|
| Component A | 51.8 | 51.8 | 51.8 | 51.8 |
| Component B | 33 | 33 | 33 | 33 |
| Styrene | 5 | 5 | 5 | 5 |
| Divinylbenzene | 3.9 | 3.9 | 3.9 | 3.9 |
| Component C | 3.3 | 3.3 | 3.3 | 3.3 |
| Component D | 0.7 | 0.7 | 0.7 | 0.7 |
| t-butyl perbenzoate | 1.8 | 1.8 | 1.8 | 1.8 |
| Component E | 3 | 3 | 3 | 3 |
| Zinc Stearate | 1 | 1 | 1 | 1 |
| Component F | 210 | 210 | 210 | 210 |
| Component I | 6 | 8 | 10 | 12 |
| Viscosity (Mcps) |  |  |  |  |
| After 3 min. | 12.6 | 13.9 | 17.8 | 23.3 |
| After 15 min. | 19.8 | 29.7 | 129.6 | 174 |
| Viscosity (MMcps) |  |  |  |  |
| After 1 day | 29 | 42.9 | 43.5 | 49 |
| After 2 days | 37.1 | 50.2 | 53.8 | 71 |
| After 3 days | 36.5 | 50.2 | 53.8 | 71 |
| After 4 days | 36.3 | 43.8 | 74.3 |  |

EXAMPLE VI

Table 6 shows the effect of calcium oxide on the thickening response of the formulation in Example II. Preferred low pressure thickening response was obtained with the higher levels of Component J. The molding composition was very sensitive to the concentration of Company J.

TABLE 6

|  | I | II | III | IV | V |
|---|---|---|---|---|---|
| Component A | 51.8 | 51.8 | 51.8 | 51.8 | 51.8 |
| Component B | 33 | 33 | 33 | 33 | 33 |
| Styrene | 5 | 5 | 5 | 5 | 5 |
| Divinylbenzene | 3.9 | 3.9 | 3.9 | 3.9 | 3.9 |
| Component C | 3.3 | 3.3 | 3.3 | 3.3 | 3.3 |
| Component D | 0.7 | 0.7 | 0.7 | 0.7 | 0.7 |
| t-butyl perbenzoate | 1.8 | 1.8 | 1.8 | 1.8 | 1.8 |
| Component E | 2 | 2 | 2 | 2 | 2 |
| Zinc Stearate | 2 | 2 | 2 | 2 | 2 |
| Component F | 210 | 210 | 210 | 210 | 210 |
| Component J | 13.1 | 12.1 | 11.2 | 10.5 | 9.8 |
| Viscosity (Mcps) |  |  |  |  |  |
| After 3 min. | 19.6 | 20.5 | 17.3 | 16.3 | 15.4 |
| After 15 min. | 117.2 | 87.6 | 71.2 | 67.6 | 56 |
| Viscosity (MMcps) |  |  |  |  |  |
| After 1 day | 6 | 4.2 | 3 | 2.1 | 1.2 |
| After 2 days | 9 | 5.3 | 3 | 2.4 | 1.2 |
| After 3 days | 8.3 | 4.6 | 3.1 | 2 | 1.5 |
| After 4 days | 8.7 | 4.9 | 3.2 | 2.1 | 1.2 |
| After 5 days | 9 | 5 | 3.4 | 2.7 | 1.4 |

EXAMPLE VII

Table 7 shows the effect of blends of zinc oxide and calcium hydroxide on the thickening response of the formulation in Example II. Runs III and IV produced processing viscosity that were somewhat too high to provide preferred fiberglass wet-out. Run V shows unacceptably low viscosity response with the low Acid Number copolymer of Component M. This demonstrates the significance of using a magnesium/calcium thickening agent when the thermoplastic additive has an Acid Number of less than 3.

TABLE 7

|  | I | II | III | IV | V |
|---|---|---|---|---|---|
| Component A | 51.8 | 51.8 | 51.8 | 51.8 | 51.8 |
| Component B | 33 | 33 | 33 | 33 |  |
| Component M |  |  |  |  | 33 |
| Styrene | 5 | 5 | 5 | 5 | 5 |
| Divinylbenzene | 3.9 | 3.9 | 3.9 | 3.9 | 3.9 |
| Component C | 3.3 | 3.3 | 3.3 | 3.3 | 3.3 |
| Component D | 0.7 | 0.7 | 0.7 | 0.7 | 0.7 |
| t-butyl perbenzoate | 1.8 | 1.8 | 1.8 | 1.8 | 1.8 |
| Component E | 3 | 3 | 3 | 3 | 3 |
| Zinc Stearate | 1 | 1 | 1 | 1 | 1 |
| Component F | 210 | 210 | 210 | 210 | 210 |
| Component L | 3.54 | 4.03 | 2.69 | 1.79 | 4.03 |
| Component K | 0.94 | 0.45 | 1.79 | 2.69 | 0.45 |
| Viscosity (Mcps) |  |  |  |  |  |
| After 3 min. | 14.7 | 12.5 | 73.3 | 88.4 | 12 |
| After 15 min. | 26.3 | 19.5 | 236 | 649.6 | 14.7 |
| Viscosity (MMcps) |  |  |  |  |  |
| After 1 day | 3.1 | 2.6 | 7.8 | 9.5 | 0.34 |
| After 2 days | 3.2 | 2.6 | 7.8 | 9.5 | 0.56 |
| After 4 days | 4.8 | 5.2 | 9.8 | 38.89 | 0.59 |
| After 5 days | 7.3 | 5.6 | 11.6 | >80 | 0.89 |

EXAMPLE VIII

This table shows that over the range of component G the four day viscosity decreased approximately 8%. At all thickening agent levels, the four day viscosity was good for low pressure molding.

|                       | I    | II   | III  | IV   |
|-----------------------|------|------|------|------|
| Component A           | 51.8 | 51.8 | 51.8 | 51.8 |
| Component N           | 33   | 33   | 33   | 33   |
| Styrene               | 5    | 5    | 5    | 5    |
| Divinylbenzene        | 3.9  | 3.9  | 3.9  | 3.9  |
| Component C           | 3.3  | 3.3  | 3.3  | 3.3  |
| Component D           | 0.7  | 0.7  | 0.7  | 0.7  |
| t-butyl perbenzoate   | 1.8  | 1.8  | 1.8  | 1.8  |
| Component E           | 3    | 3    | 3    | 3    |
| Zinc Stearate         | 1    | 1    | 1    | 1    |
| Component F           | 210  | 210  | 210  | 210  |
| Component G           | 10   | 12   | 16   | 20   |
| Viscosity (Mcps)      |      |      |      |      |
| After 3 min.          | 21.7 | 22.8 | 22.0 | 21.9 |
| After 15 min.         | 37.8 | 36.1 | 41.4 | 39.1 |
| Viscosity (MMcps)     |      |      |      |      |
| After 1 day           | 8.0  | 8.2  | 7.0  | 7.3  |
| After 2 days          | 10.7 | 11.7 | 8.9  | 10.1 |
| After 3 days          | 13.1 | 14.6 | 11.5 | 11.9 |
| After 4 days          | 14.4 | 16.2 | 14.6 | 13.5 |

EXAMPLE IX

This example illustrates the handling properties of the compound and the molding of an article by a molding process in accordance with the present invention

TABLE 9

|                        | I    | II   | III  | IV   | V    |
|------------------------|------|------|------|------|------|
| Component A            | 51.8 | 51.8 | 51.8 | 51.8 | 51.8 |
| Component B            | 33   | 33   | 33   | 33   | 33   |
| Styrene                | 5    | 5    | 5    | 5    | 5    |
| Divinylbenzene         | 3.9  | 3.9  | 3.9  | 3.9  | 3.9  |
| Component C            | 3.3  | 3.3  | 3.3  | 3.3  | 3.3  |
| Component D            | 0.7  | 0.7  | 0.7  | 0.7  | 0.7  |
| t-butyl perbenzoate    | 1.8  | 1.8  | 1.8  | 1.8  | 1.8  |
| Component E            | 3    | 3    | 3    | 3    | 3    |
| Zinc Stearate          | 1    | 1    | 1    | 1    | 1    |
| Component F            | 210  | 210  | 210  | 210  | 210  |
| Component G            | 16   | 16   | 0    | 0    | 0    |
| Component H            | 0    | 0    | 1.8  | 0    | 0    |
| Component J            | 0    | 0    | 0    | 13.1 | 0    |
| Component K            | 0    | 0    | 0    | 0    | 1.7  |
| Fiberglass 1 inch Wt. %| 28   | 28   | 28   | 28   | 28   |
| Fiberglass Wet Out     | good | good | good | good | poor |
| Sheet Dryness          | good | good | poor | poor | N/A  |
| Carrier Film Peelability | good | good | poor | poor | N/A |

In addition to the specific aspects of the invention described above, those skilled in the art will recognize that other aspects of the invention are intended to be included within the scope of the claims which follow. For example, in addition to the alkaline earth metal oxide and hydroxides disclosed herein, those skilled in the art will recognize that materials such as, for example, hydroxyl containing silica or alumina may be suitable for use as the thickeners in accordance with the present invention.

We claim:

1. A process for molding an article comprising:
   (A) forming a molding composition comprising:
      (i) an unsaturated thermosetting resin;
      (ii) an olefinically unsaturated monomer which is copolymerizable with said unsaturated thermosetting resins;
      (iii) a thermoplastic additive having an Acid Number of from 4 to 8; and
      (iv) a thickener which comprises one or more alkaline earth metal oxides or hydroxides in an amount effective to provide the molding composition with a Molding Viscosity of less than 25 MMcps:
   (B) aging the molding composition for at least one day; and
   (C) molding the aged molding composition at an effective pressure, temperature and time to form said molded article.

2. The process of claim 1 wherein the pressure is from about 30 to 400 psig.

3. The process of claim 1 wherein the temperature is from about 200° to 320° F.

4. The process of claim 1 wherein the aging is conducted over a time period of from about 1 to 4 days or more.

5. The process of claim 1 wherein the thickener is selected from the group consisting of calcium oxide, calcium hydroxide, magnesium oxide, magnesium hydroxide, zinc oxide, and mixtures thereof.

6. The process of claim 1 wherein the thermoplastic additive is a polyvinyl acetate homopolymer or copolymer having a weight average molecular weight of from about 50,000 to 180,000 grams per gram mole.

7. The process of claim 1 wherein the composition further comprises a viscosity reducing additive.

8. The process of claim 7 wherein the viscosity reducing additive is selected from the group consisting of aliphatic monocarboxylic acids, amino acids, amido acids, phosphate esters, polyalkylene oxides and mixtures thereof.

9. The process of claim 1 wherein the molding composition has a Molding Viscosity of from about 2 to 20 MMcps.

* * * * *